Feb. 9, 1965  R. K. ROYCE  3,169,219
OPEN WIRE DIRECTIONAL ELECTROMAGNETIC COUPLER
Filed June 29, 1961  2 Sheets-Sheet 1

INVENTOR
RICHARD K. ROYCE
BY
ATTORNEY

INVENTOR
RICHARD K. ROYCE 3,169,219
OPEN WIRE DIRECTIONAL ELECTROMAGNETIC COUPLER
Richard K. Royce, Alexandria, Va., assignor to the United States of America as represented by the Secretary of the Navy
Filed June 29, 1961, Ser. No. 120,801
8 Claims. (Cl. 324—95)
(Granted under Title 35, U.S. Code (1952), sec. 266)

The invention described herein may be manufactured and used by or for the Government of the United States of America for governmental purposes without the payment of any royalties thereon or therefor.

This invention relates in general to transmission line measurement devices and in particular to devices of the standing wave ratio measurement variety for use on open wire lines.

As is well known the standing wave ratio is normally obtained by use of a reflectometer which measures the reflection coefficient, that is, the ratio of the forward and backward or incident and reflected traveling wave magnitude present on the transmission line. Generally, in the case of open wire lines, the standing wave ratio has been obtained by using a movable probe to determine the wave magnitude at various predetermined points along the transmission line. Movable elements in high frequency transmission lines are undesirable because of the difficulties arising from imperfect electrical coupling between the line and the movable element which introduces considerable error in standing wave measurements. In addition, such movable probe devices require at least two consecutive measurements of wave magnitude to be made at different points along the transmission line.

The operation of a reflectometer or directional coupler depends on the fundamental relationship between voltage and current at any point on a transmission line. The line voltage and current may be measured and combined by various means. Theoretically, it is merely necessary to derive a voltage proportional to line current and combine it with a suitable fraction of the line voltage. In practice great difficulty has been encountered in obtaining the voltage proportional to line current in correct phase relationship. One of the simplest techniques used in the past was to provide an inductive coupling loop terminated in a resistance much greater than the loop reactance, as the current element. Such as design provided a small voltage having very nearly a 90° phase difference with respect to the line current and varying approximately proportional to the frequency. A small capacitive coupling was used for the voltage element to match the phase angle and frequency characteristics of the current loop. The resultant sum and difference voltages obtained correctly represented the incident and reflective waves, except for a factor proportional to frequency and a near 90° phase shift. Apparatus such as described above, which permits the separate measurement of the magnitude of forward and backward traveling waves in a transmission line or wave guide, employed pick-up coupling means of opposite signs for detecting separately the forward and backward traveling waves, but the couplings were either inductive or capacitive and of opposite sign. Whereas, such known apparatus generally involves fixed complementary inductive or capacitive coupling between the transmission line and measurement device, it will be appreciated that such apparatus is limited to measurement within a restricted frequency bandwidth.

It is an object of this invention to provide an improved reflectometer which does not necessitate interruption of the line for measurement purposes.

It is another object of this invention to provide a measurement device for use with open wire transmission lines which affords complete measurement possibilities.

It is also an object of this invention to provide an improved reflectometer which may be permanently installed at a selected point on the transmission line for monitoring purposes.

It is still another object of this invention to provide a relatively inexpensive reflectometer which is adaptable to any standard open wire transmission line involving one or more pairs of parallel lines.

It is a further object of this invention to provide a monitoring reflectometer which is adaptable to relatively high power transmission line measurement applications.

Other objects of this invention will be appreciated upon a more comprehensive understanding of the invention for which reference is had to the following specification and drawings wherein.

Briefly, the device of this invention is a means for sampling selected portions of wave energy in a transmission line system which is particularly adaptable to an open wire transmission line system. The device is especially useful in high power applications in that it does not require movement of the device for measurement purposes and does not absorb a large fraction of the power in the transmission line system.

Figure 1:
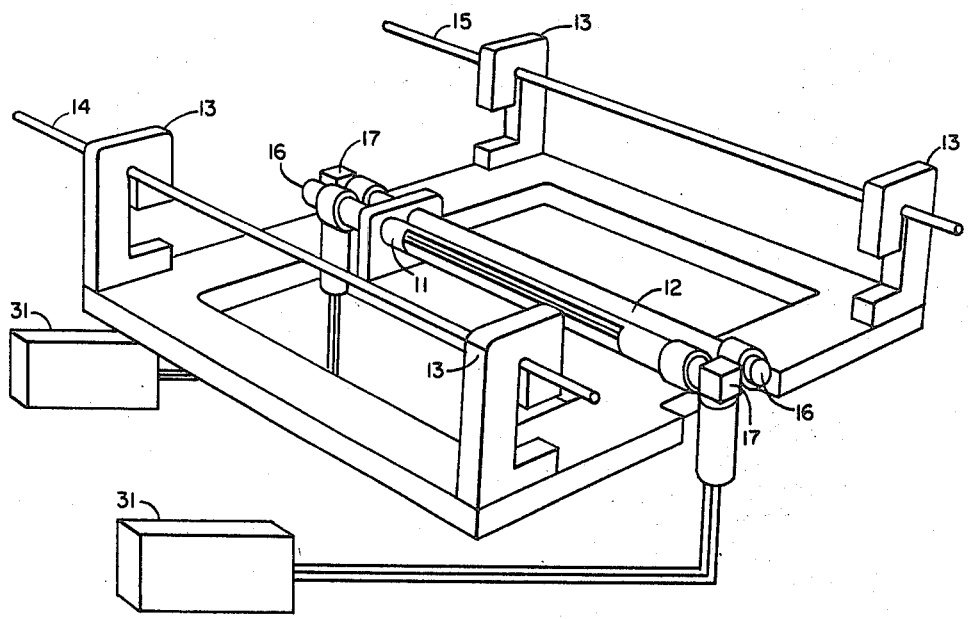
FIG. 1 is a pictorial showing of the device of this invention in an open two wire transmission line embodiment.

Referring now to FIG. 1, two coaxial line sections 11 and 12 are mounted in parallel relation on a bracket of electrical insulating material such as Lucite and the bracket 13 is hung on parallel open wire lines 14 and 15 such that the coaxial transmission line sections 11 and 12 are disposed in parallel relation with the open wire lines 14 and 15 with the sections 11 and 12 disposed one to either side of the plane of symmetry between the lines 14 and 15. As shown in the drawing, each coaxial section has a slot aperture facing its respective open wire line and is terminated at one end by a resistive impedance means 16 and at the other end by an energy take-off coupler 17. For reasons which will become apparent hereinafter, the resistive impedance means and the energy take-off coupler are shown in reverse relation on the two coaxial sections.

It will be appreciated that the type of insulating material of which the bracket 13 is made is not critical to the device of this invention and Lucite, wood, polystyrene and other comparable materials may be used with preference given to Lucite when the reflectometer is adapted for sliding contact with the open wire lines. Likewise, the particular bracket configuration shown in the drawing is not critical and may be readily adapted, for example, to support the coaxial sections 11 and 12 above the lines 14 and 15, or otherwise if desired.

Figure 2:
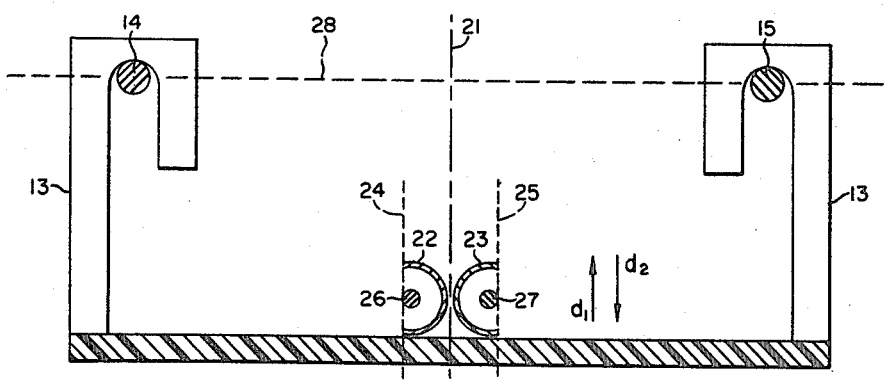
FIG. 2 is a more detailed end view cross sectional showing of the device of this invention in the embodiment of FIG. 1.

FIG. 2 is an end view cross section of the reflectometer of this invention in a typical embodiment such as that of FIG. 1, which illustrates the disposition of the substantially identical coaxial sections 11 and 12 with respect to the lines 14 and 15 and with respect to the plane of symmetry therebetween, indicated at 21.

In FIG. 2, windows have been cut in the outer conductors 22 and 23 of coaxial sections 11 and 12 along planes indicated at 24 and 25, respectively, which are equidistant and parallel to the plane of symmetry 21, to permit the coupling of energy from line 14 to center conductor 26 of coaxial section 11 and from line 15 to center conductor 27 of coaxial section 12. It is appreciated that for optimum coupling between each coaxial section and its respective line, the coaxial sections should be in the plane indicated at 28. Actual placement of the coaxial sections is dependent upon such factors as the relative sensitivity of the detectors employed as compared with the power in the transmission line system, the effect, if any, of the coaxial sections on the transmission line characteristics, etc. It has been found in some instances that the effect of the coaxial section is negligible when the coaxial sections are in the plane 28 and the spacing between lines is about 12 inches. In other applications, for example, utilizing a standard 600 ohm line with six inch spacing between lines, and a coaxial section approximately ½ inch in diameter, it has been found that the effect of the coaxial section is negligible when the center conductor of each coaxial section is spaced approximately 3 inches from its respective one of the pair of lines. Moving the coaxial section in the direction $d_1$ increases the sensitivity of the device, and moving the coaxial section in the direction $d_2$ decreases the sensitivity of the device. For a given placement of the coaxial section with respect to its respective line and for a given frequency, lengthening the window in the coaxial section increases its sensitivity and shortening the window decreases its sensitivity. It will be appreciated that the aperture should be so placed and be of such dimension that coupling is provided only with respect to one transmission line and that enlarging the aperture, for example providing a window with a cut-out arc greater than the approximately 130° shown in FIG. 2, would tend to permit coupling of energy from the other line. Such additional coupling is undesirable and should be minimized, in the ideal arrangement such coupling should be zero. It has been found that at least 99% shielding from other line is provided with the approximately 130° cut-away arc shown in FIG. 2.

In FIG. 2 the plane of symmetry 21 is effectively at the potential of the ground plane, indicated at 29. The outer conductors of the two coaxial sections may be substantially in the plane of symmetry 21 but separated one from the other, as shown, or the outer conductors may be electrically connected, if desired.

Figure 3:
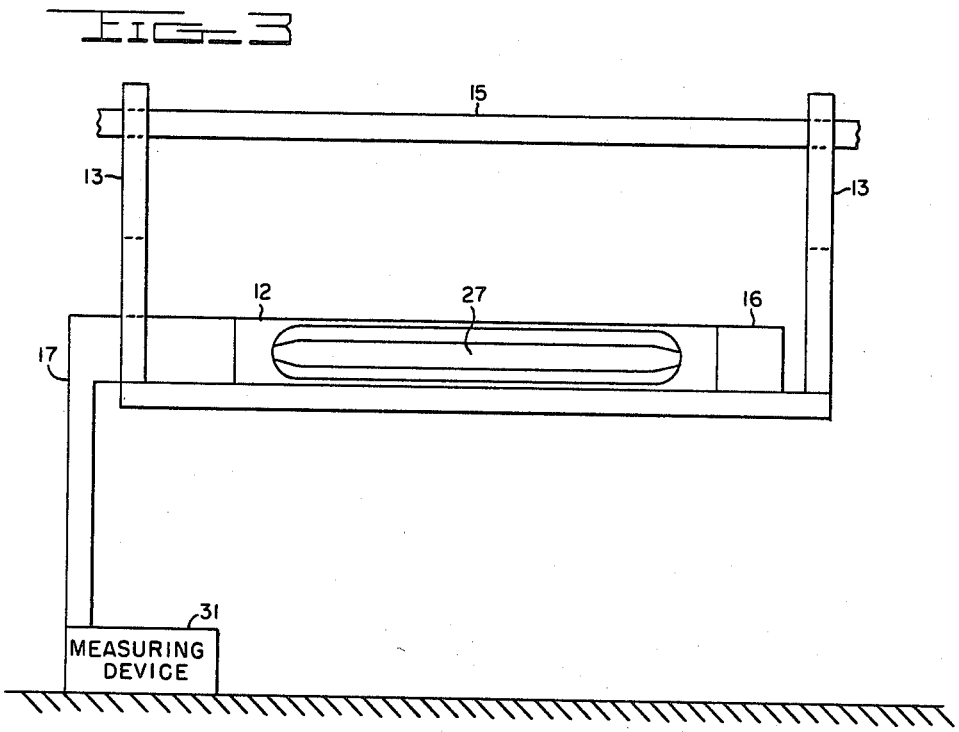
FIG. 3 is a more detailed side view showing of the device of this invention in the embodiment of FIG. 1.

FIG. 3 is a side view of the reflectometer of this invention in a typical embodiment such as that of FIG. 1. In FIG. 3 only one coaxial section and only one transmission line is in view, and for purposes of simplicity only one coaxial section will be discussed. The coaxial section 12 in FIG. 3 is a conventional coaxial section with a resistive impedance indicated at 16 attached to one end and a measuring device 31 connected by a coupling means 17 to the other end of the coaxial section. It would be noted, however, that the center conductor 27 in the area of the aperture has been slightly enlarged in the embodiment of FIG. 3. This enlargement is not essential to the operation of the device of this invention but is provided to compensate for the alteration in impedance of the line due to the aperture therein and to thus permit the employment of a standard 50 ohm termination device 16. It is appreciated that if a non-standard termination device were acceptable for a particular application, for example, a 65 ohm termination device, there would be no necessity for the enlargement of the center conductor. It has been found highly desirable, however, to employ a standard 50 ohm termination which permits the connection of standard 50 ohm input measurement devices. It is also appreciated that any other known impedance compensation means may be used in place of the expedient change in diameter of the center conductor.

Since the reflectometer of this invention draws very little power from the transmission line system it has been found that a relatively small 50 ohm termination device may be utilized in high power applications, for example, where the rating of the transmission line system is in the neighborhood of 50 kw., a ½ watt termination device has been found to be satisfactory for use with a ½ inch diameter coaxial section 8 inches long and having a 5 inch aperture.

As shown in FIG. 3 the device of this invention is connected for reflected energy measurement. Interchanging the position of the 50 ohm termination 16 and the connection of the measurement device 31 would afford a measurement of the forward energy in the system. Thus with two coaxial sections such as shown in the embodiment of FIG. 1, complete measurement possibilities on a balanced open two wire line are provided. As an example, the device of this invention may be used for (1) transmission line direct and reflected power measurements, (2) transmission line reflection coefficient measurements, (3) transmission line standing wave ratio measurements, (4) transmission line balance measurements, (5) load bandwidth measurements and (6) load match indication. Of course, in each of the above listed measurements, suitable detectors would have to be employed as the measurement device 31.

Figure 4:
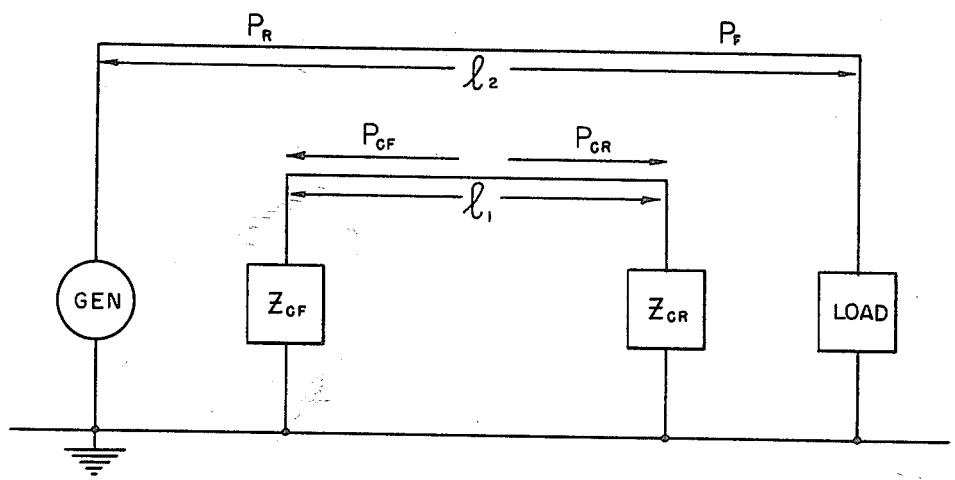
FIG. 4 is a diagrammatic showing of the operation of the device of this invention in the embodiment of FIG. 1.

Referring now to FIG. 4, in operational analysis, an elemental length of transmission line $l_1$, parallel and coupled to a driven transmission line $l_2$ exhibits directional coupling. That is, if the forward power $P_f$ is to the right in transmission line $l_2$ and reflected power $P_r$ is to the left in transmission line $l_2$; then the coupled reflected power $P_{cr}$ is proportional to $P_r$ and directed to the right and the coupled forward power $P_{cf}$ is proportional to $P_f$ and directed to the left. If transmission line $l_1$ is terminated at each end in its characteristic impedance $Z_c$, there are no reflections on the coupled line. Consequently, voltage measured across the impedance $Z_{cf}$ is proportional to forward power in transmission line, $l_2$, and voltage measured across impedance $Z_{cr}$ is proportional to reflected power in the transmission line $l_2$.

The device of this invention is adaptable to any multiple wire transmission line system and is not limited to the two wire transmission line system shown in the drawings. Moreover, the device of this invention is adaptable to wave energy transmission systems other than open wire lines but, as discussed above, is particularly suitable for the latter type of transmission line. Also, as discussed above, the device of this invention draws very little power, will not burn out in normal operation and does not substantially load or otherwise change the characteristics of the line. Consequently, the device of this invention may be permanently installed as a continuous monitoring unit, if desired. It is appreciated that continuous monitoring of the line is particularly desirable, for example, in remote beacon installations, where transmission must be maintained at all times. In such installations, a constant monitoring of the transmitter does not suffice because irregularities in the transmission line and/or antenna portion of the system, which might reduce or interrupt transmission, may not be detectable thereby.

It is appreciated that the device of this invention may be an all weather unit by the addition of a canopy, not shown in the drawings, or other weather protective arrangements which would not interfere with the transmission line characteristics.

While a 50 ohm monitoring system has been illustrated herein, it is appreciated that the device of this invention is not limited to such systems and that less compatible impedances may be employed if desired (especially in ratio determinations) without significant alteration. It is appreciated, of course, that in measuring such factors as actual power additional calibration may be required. In actual operation, it has been found that coupling runs above 70 db at 2 mc. to 30 db at 30 mc. It may be expected, of course, that these figures will vary among particular assemblies.

In addition, the device of this invention reduces the problem of matching one portion of a system (i.e., a transmission line) having a selected impedance to another portion of the system (i.e., an antenna) having an impedance which differs from that of the other portion. By reason of this simplification, unskilled operators can be relied upon to perform matching operations with reasonable assurity of satisfactory performance.

Finally, it is understood that this invention is only to be limited by the scope of the claims appended hereto.

What is claimed is:

1. A device for wave energy analysis in a parallel two wire transmission line system, comprising:

first and second directional coupler means for coupling wave energy from respective wires in said system;

support means adapted to support said first and second directional couplers in juxtaposition, such that substantially all the wave energy coupled by each of said directional couplers is from its respective wire of said parallel wire system;

measuring means coupled to said first and second directional couplers for indicating the wave energy coupled thereby, said first and second directional couplers with said measuring means being capable of discriminating between the forward and reflected wave energy in said system and providing an indication of one of same.

2. The device as defined in claim 1, wherein said first and second directional coupler means are coaxial line sections aligned with the wires of said parallel wire system, the outer conductors of said coaxial line sections being disposed substantially in the plane of symmetry between the wires of said parallel wire system, and each of said coaxial line sections having at least one aperture in its outer conductor facing its respective wire in said system.

3. The device as defined in claim 2 wherein said coaxial line sections have a constant impedance along the length thereof.

4. The device as defined in claim 2 wherein said first and second coaxial line sections are substantially identical.

5. The device as defined in claim 2 wherein said coaxial line sections each include respective termination means at one end thereof and said measuring means is connected to the other end of each of said line sections.

6. The device as defined in claim 2 wherein the inner conductor of each of said coaxial sections is of enlarged diameter in the region of said aperture.

7. The device as defined in claim 5 wherein the conductor of each of said coaxial sections is of enlarged diameter in the region of said aperture.

8. A device for wave energy analysis in a parallel multi-wire transmission line system, comprising:

a plurality of directional coupler means equal in number to the number of wires in said system for coupling wave energy from respective wires in said system at a selected point thereon;

support means adapted to support said plurality of directional couplers substantially in juxtaposition such that substantially all the wave energy coupled by each of said directional couplers is from its respective wire of said parallel wire system;

measuring means coupled to said plurality of directional coupler means for indicating the wave energy coupled thereby, said plurality of directional coupler means with said measuring means being capable of discriminating between forward and reflected wave energy in said system and providing an indication of one of same.

References Cited by the Examiner
UNITED STATES PATENTS

| 2,531,777 | 11/50 | Marshall | 333—10 |
| 2,562,281 | 7/51 | Mumford | 333—10 |
| 2,679,632 | 5/54 | Bellows | 333—10 |
| 2,972,121 | 2/61 | Firestone | 333—10 |

OTHER REFERENCES

"Analysis of Transmission Line Directional Couplers," W. L. Firestone, Proceedings of the I.R.E., October 1954.

HERMAN KARL SAALBACH, *Primary Examiner.*

BENNETT G. MILLER, *Examiner.*